(12) United States Patent
VanValkenburgh

(10) Patent No.: US 7,000,901 B1
(45) Date of Patent: Feb. 21, 2006

(54) MOTORCYCLE STAND

(76) Inventor: Charles Nicholas VanValkenburgh, 620 Pearl Ave., Huntsville, AL (US) 35801

(*) Notice: Subject to any disclaimer, the term of this patent is extended or adjusted under 35 U.S.C. 154(b) by 184 days.

(21) Appl. No.: 10/771,952

(22) Filed: Feb. 4, 2004

Related U.S. Application Data

(60) Provisional application No. 60/445,014, filed on Feb. 5, 2003.

(51) Int. Cl.
*B66F 3/00* (2006.01)
(52) U.S. Cl. .................................................. 254/131
(58) Field of Classification Search ............... 211/17, 211/20, 22; 254/129, 131, 134
See application file for complete search history.

(56) References Cited

U.S. PATENT DOCUMENTS

| | | | | |
|---|---|---|---|---|
| 6,488,157 B1 * | 12/2002 | Chen | ........................ | 254/131 |
| 6,802,493 B1 * | 10/2004 | Lance | ........................ | 254/131 |
| 6,840,506 B1 * | 1/2005 | Siivonen | ........................ | 254/131 |

* cited by examiner

*Primary Examiner*—Robert C. Watson

(57) ABSTRACT

A stand for lifting the front end of a motorcycle that includes a base pivotally connected to an upper support structure. The base consists of a support frame with fulcrum wheels attached; a lever arm extends forward from the base for operation by hand. The upper support structure has adjustable brackets at the connection with the base that allows for height adjustment of the stand for motorcycles of various heights or for lifting the same motorcycle to different heights as desired.

2 Claims, 3 Drawing Sheets

MOTORCYCLE STAND

CROSS REFERENCE TO RELATED APPLICATIONS

This application claims the benefit or the filing date of provisional application 60/445,014 entitled Motorcycle Stand filed Feb. 5, 2003.

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

Work stands are a necessary tool to be used when performing maintenance on a motorcycle such as changing the tires or working on the brakes. Many maintenance tasks require removing the front wheel and therefore a stand to lift the front of a motorcycle must connect to the base of the forks or a position underneath the steering stem to give access to the front axle. There are many varieties of this type of stand on the market today. One limitation of these stands however, is accommodating motorcycles of different heights or raising the same bike to different heights. A stand that will work well on a smaller motorcycle will not work as well with a larger one. To eliminate the need for multiple stands, there is a need for a stand that adequately supports the motorcycle and is height adjustable.

BRIEF SUMMARY OF THE INVENTION

The present invention is an improvement to a motorcycle front stand that will enable adjustments to be made in the working height of the stand. A motorcycle stand is disclosed with a lower rotatable base portion that is adjustably connected to an upper frame that engages the lower end of the steering stem of a motorcycle. The bass portion consists of a pair of arms to which are affixed a pair of fulcrum wheels and a handle for operation. The upper frame consists of support structure with adjustable brackets to connect to the lower frame and an arm with an upwardly disposed pin to insert into the steering stem of a motorcycle.

Other objects and advantages of the present invention will be apparent from the following description, the accompanying drawings and the appended claims.

DETAILED DESCRIPTION OF THE INVENTION

Figure 1:
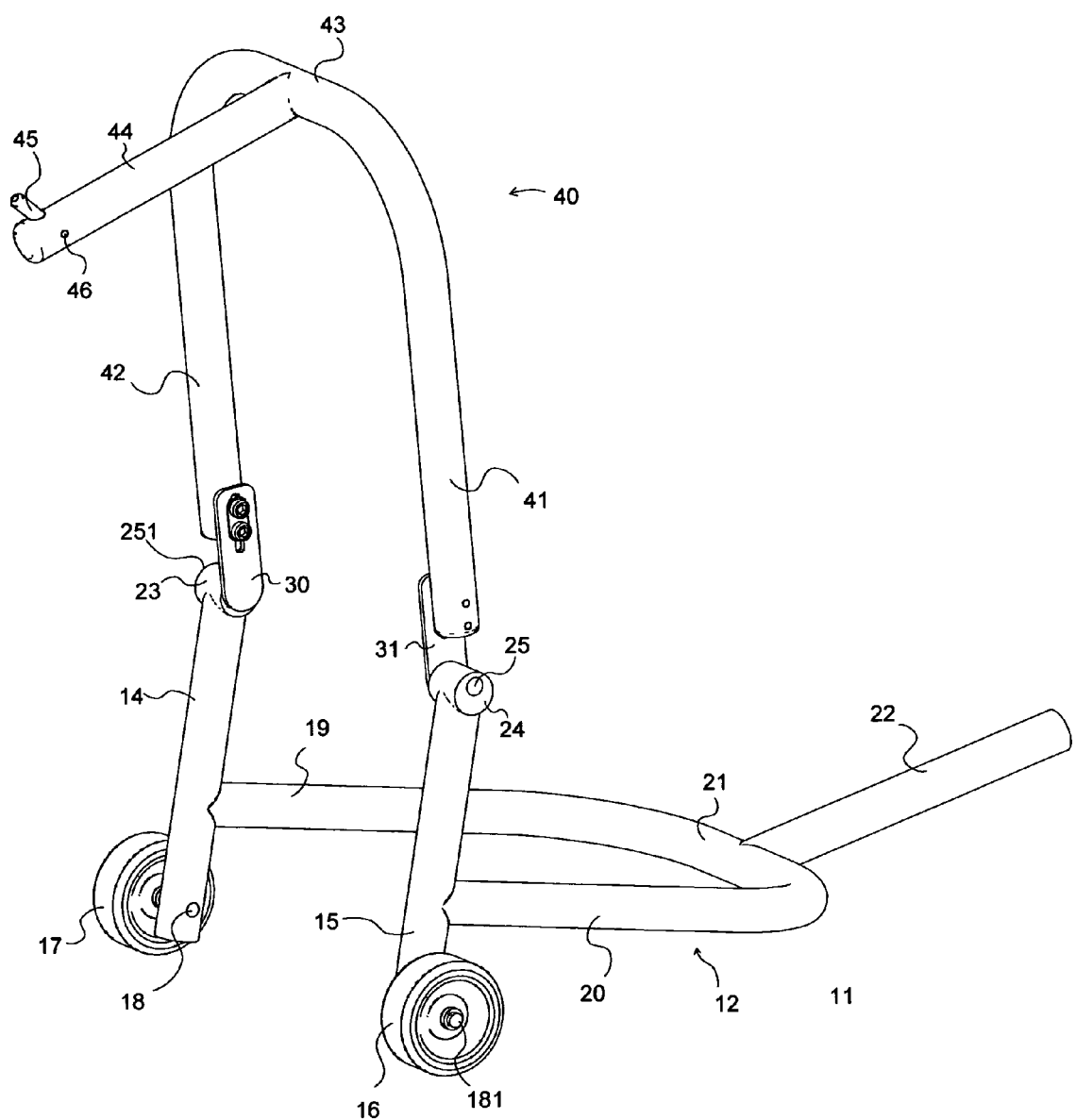
FIG. 1 is a perspective view of the improved stand
Figure 2:
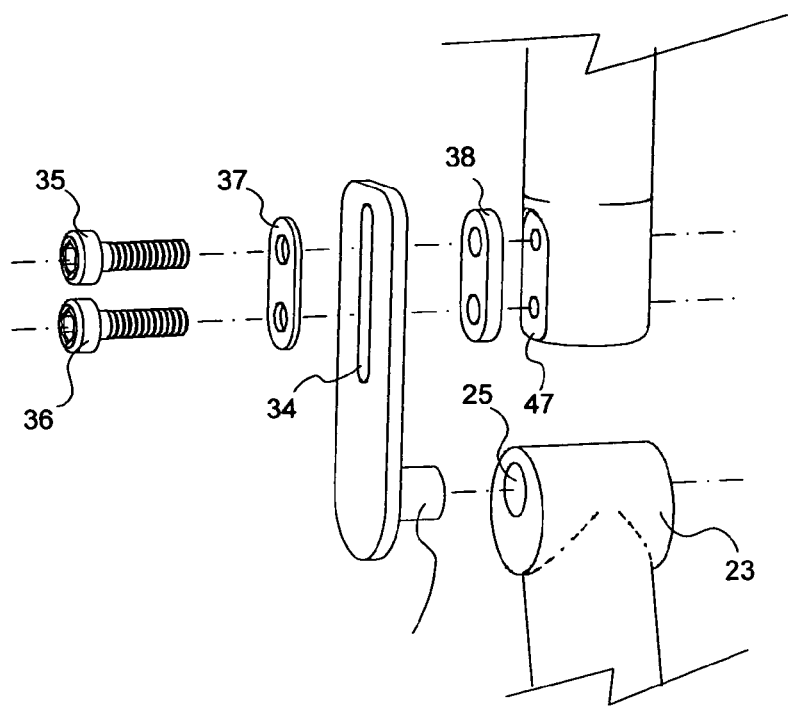
FIG. 2 is a perspective view of the adjustable bracket in detail
Figure 3:
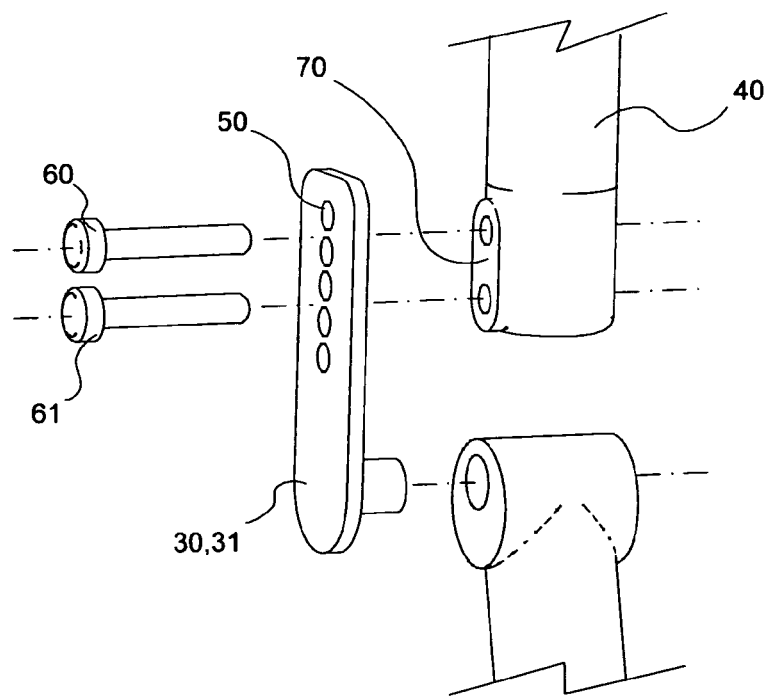
FIG. 3 is an elevation view of the stand in operation.

Referring to FIGS. 1, 2, and 3, the embodiment of the stand of the present invention has a base support frame designated at 12 consisting of two upwardly disposed parallel members 14, 15 and at the lower portion of each are connected two fulcrum wheels 16, 17 by means of a bolt or pin 18, 181. A pair of horizontal, forwardly disposed members 19,20 are connected to upwardly disposed parallel members 14,15. Members 19,20 are rigidly connected by means of a transverse member 21. Extending forward from transverse member 21 is a handle 22 that is used to leverage base support frame 12 during operation of the stand. At the top of each upwardly disposed members 14,15 is an integral horizontal member 23,24 with concentric through holes 25,251 for mating with adjustable brackets 30,31.

An upper support structure 40 consists of two generally vertical members 41,42 rigidly connected by a horizontal cross member 43. As shown in FIG. 1, a member 44 for engagement with the motorcycle extends longitudinally from the horizontal cross member 43. Engagement member 44 has a pin 45 fixed by means of a bolt or pin 46 at the outward end for engagement with the motorcycle steering stem.

Attached at the lower end of vertical members 41,42 of the upper support structure 40 are adjustable brackets 30,31. As seen in FIG. 2, brackets 30,31 are flat, vertically oriented plates with horizontally disposed cylindrical protrusion 32 to provide rotational engagement with the hole 25 in the horizontal member 23. An elongated slot 34 is provided in brackets 30,31 to allow for vertical adjustment. Bolts 35,36 pass through an optional washer 37 and through brackets 30 and 31, then through optional spacer 38, and into threaded holes in the base of vertical members 41,42. Adjustments in the relative position of upper support structure 40 to base 12 are made by loosening bolts 35,36 and positioning as desired and then tightening bolts 35,36.

The bracket 30, 31 can take many forms and an alternative embodiment is shown in FIG. 3. Brackets 30, 31 may have a series of holes 50 to allow adjustment of the height of the stand. They may be connected to upper support structure 40 by means of pins 60,61. The base of vertical members 41,42 may be designed so as to have a raised flat area 70 so that optional spacer 38 would be unnecessary.

Figure 4:
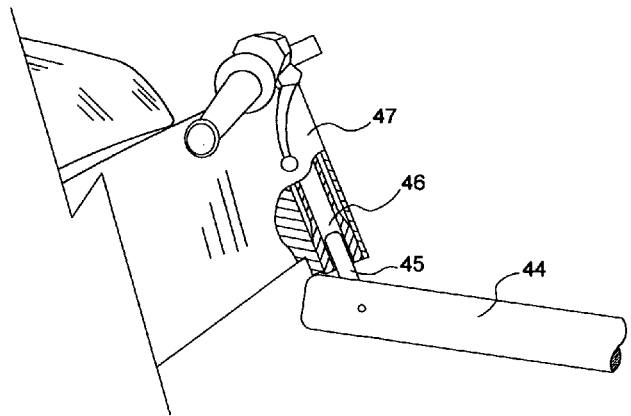
Figure 5:
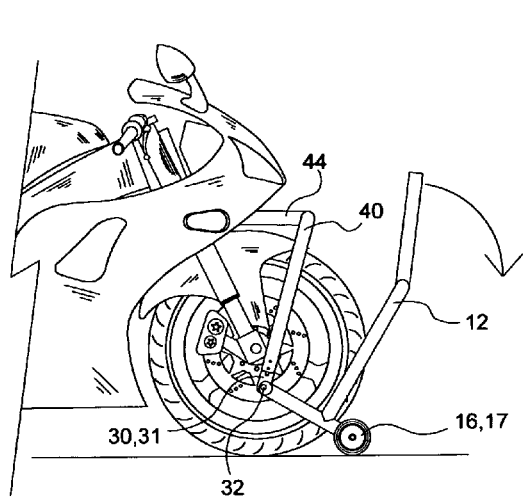
Figure 6:
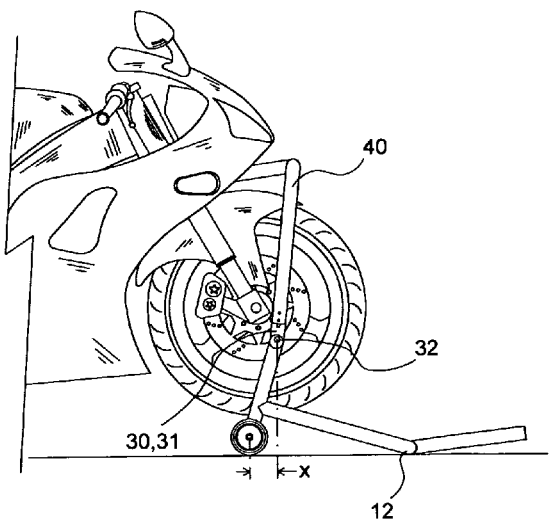

Referring to FIGS. 4, 5 and 6, the stand is operated by rotating base support 12 forward so that the pin 45 may be inserted into the hole 46 in the lower end of the steering stem 47 of the motorcycle. After the pin is inserted, base 12 is rotated on fulcrum wheels 16,17 which causes a corresponding lift on upper support structure 40 thereby lifting the motorcycle until fulcrum wheels 16,17 pass underneath pivoting brackets 30,31 some distance x at which time front portion of base 12 contacts the ground.

What I claim is:

1. A front motorcycle stand comprising
    a. a supporting base comprising two upwardly disposed parallel members with an upper end and a lower end, each of said parallel members having a wheel attached to said lower end to facilitate rolling along the ground; said supporting base also comprising two forwardly disposed horizontal frame members with a forward end and a rearward end attached to said lower end of said upwardly disposed members; a transversely disposed cross member attached to said forward end of each of said horizontally disposed members to rigidly affix said horizontal members to one another; a handle attached to said cross member for leveraging end of said supporting base;
    b. an upper support frame comprising two upwardly disposed frame members with an upper end and a lower end, said frame members rigidly connected at said upper ends by a cross member; a rearwardly disposed motorcycle support member rigidly attached to said cross member; a vertically disposed steering head pin rigidly affixed to said motorcycle support member for mating with the steering head of said motorcycle;

c. means for pivotally and adjustably attaching said supporting base to said upper support frame.

2. The stand of claim 1 where said pivotal and adjustable attaching means further comprises a. pair of transversely disposed hollow members attached to the upper end of said supporting base;

b. a pair of transversely disposed pins adjustably attached to the lower end of upper support frame; said pins fitting inside said hollow members to allow pivotal movement.

* * * * *